A. S. HOWELL.
LENS MOUNT FOR CAMERAS.
APPLICATION FILED OCT. 11, 1919.
1,417,526.        Patented May 30, 1922.
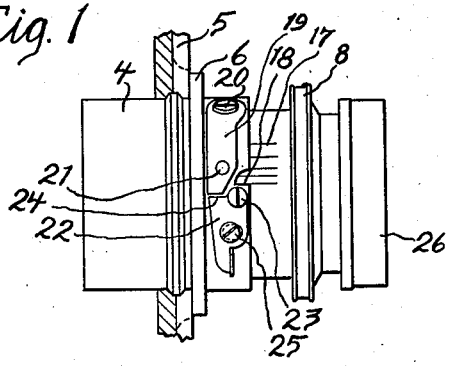
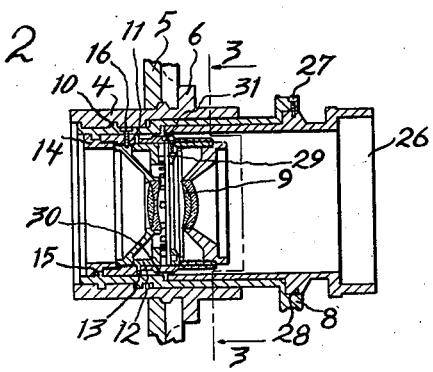
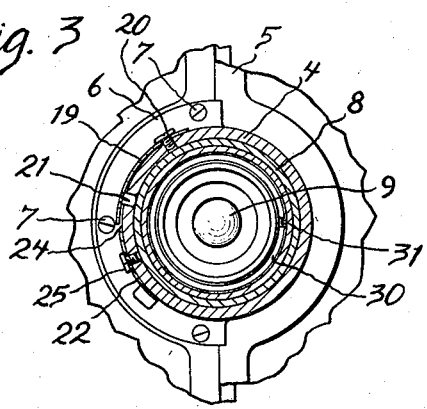
Inventor
Albert S. Howell.
By Miehle + Miehle,
Attorneys.

UNITED STATES PATENT OFFICE.

ALBERT S. HOWELL, OF CHICAGO, ILLINOIS, ASSIGNOR TO BELL AND HOWELL COMPANY, OF CHICAGO, ILLINOIS, A CORPORATION OF ILLINOIS.

LENS MOUNT FOR CAMERAS.

1,417,526.      Specification of Letters Patent.      Patented May 30, 1922.

Original application filed April 23, 1919, Serial No. 293,249. Divided and this application filed October 11, 1919. Serial No. 330,144.

*To all whom it may concern:*

Be it known that I, ALBERT S. HOWELL, a citizen of the United States, residing at Chicago, in the county of Cook and State of Illinois, have invented a certain new and useful Improvement in Lens Mounts for Cameras, of which the following is a full, clear, concise, and exact description, reference being had to the accompanying drawings, forming a part of this specification.

My invention relates to lens mount for cameras.

The invention contemplates a structure which permits of a quick and convenient interchange of lenses and one of the features of the invention relates to the provision of a structure which provides for the focal adjustment of the lens, which is adapted to hold the lens firmly upon the camera in an adjusted position, and which permits of a quick and convenient interchange of lenses.

Another feature of the invention relates to the provision of structure whereby a lens may be mounted within a bush in a simple and secure manner and which is particularly adapted to a bush formed of aluminum.

The above features and certain other features hereinafter appearing are embodied in the preferred form of my invention herein after fully described and illustrated in the accompanying drawings, and are effected by certain novel constructions, combinations and arrangements of parts particularly pointed out in the claims.

In the said drawings Fig. 1 is a view in side elevation of a lens mount embodying the features of my invention. Fig. 2 is a central vertical section of the same. Fig. 3 is a sectional view of the same on the line 3—3 of Fig. 2.

Like characters of reference indicate like parts in the various views.

In the drawings 4 indicates a bush which is mounted in an opening of a camera closure 5 by means of a flange 6 secured to the casing with headed screws 7. The camera closure 5 shown is similar to the closure described and claimed in U. S. application, Serial No. 293,249, filed by me April 28, 1919, for improvement in motion picture cameras and tripods of which the present application is a division. A second bush 8, in which a camera lens 9 is mounted, as hereinafter described, has external screw threads 10 formed on the outer surface at the rearward end thereof, which screw threads engage corresponding internal screw threads formed on the inner surface of bush 4 at the rearward end thereof. The camera lens 9 is secured within the bush 8 by means of an internally threaded ring 11 screw threaded upon the rear end of the lens body 12 against the rearwardly facing shoulder of the usual flange 13 of this body and an externally flanged clamp ring 14 screw-threaded into the rear end of ring 11 and having its flange engaging the rear surface of an internal rib 15, formed on the bush 8, and clamping the rear end of the ring 11 against the front surface of this rib. See Fig. 2. Thus it will be noted that the lens is secured within the lens bush 8 by means which does not require fine screw threads to be formed on the bush 8, thereby permitting the bush 8 to be formed of aluminum without the usual difficulties incident to cutting fine threads in aluminum. A headed screw 16 is disposed radially in a countersunk hole in the bush 8 and is screw-threaded into the ring 11 and engages a hole in the lens body 12 to maintain the lens body and bush 8 in proper relation. The screw-threaded engagement of the bushes 4 and 8 provide a focal adjustment for the lens 9 and the screw threads 10 are preferably of such a pitch that the several focal adjustments of the lens are made within one revolution of the bush 8 with relation to bush 4. The portion of the bush 8 which extends in front of the bush 4 is provided with an index 17 which is co-related with a cut 18 formed in the adjacent edge of bush 4 to determine the adjustments of the lens, and by reason of the fact that the several adjustments of the lens are effected within one revolution of the bush 8 within bush 4, this index is a simple one and requires no calculation in the use thereof. By the lens mounting just described the quick interchange of lenses may be accomplished as the bush 8 is sufficiently large to accommodate a variety of lenses and each lens is mounted within a bush 8 adapted to fit within the bush 4 and having screw threads 10 adapted to engage the internal screw threads of bush 4, and in changing lenses it is only necessary to remove the bush 8 with the lens carried therein and to insert another bush 8, carrying the desired lens, into bush 4. Thus the screw-threaded engagement of bushes 8 and 4 provides a lens adjustment and provides for a quick and easy interchange of lenses.

Mounted on the outer surface of bush 4 at the front end thereof in front of the closure of the camera is a spring blade 19 which is disposed circumferentially of the bush and is secured thereto at its one end by a headed screw 20. See Figs. 1 and 3. The free end of this blade has a radially disposed pin 21 extending inwardly through an aperture in bush 4 to engage the bush 8 to provide a frictional engagement between the bushes to prevent accidental movement of bush 8 within bush 4. This frictional engagement may be broken to permit the easy removal of bush 8 within bush 4 by a blade 22 pivotally secured upon bush 4 by means of a headed screw 23 and having a beveled edge 24 disposed radially with respect to screw 23 and adapted, when the blade 22 is pivoted upon screw 23 in one direction, to move between the bush 4 and the free end of spring blade 19 to move this end of the spring blade away from the bush and to disengage pin 21 from engagement with bush 8. Another headed screw 25 passes through an enlarged aperture in blade 22 to limit the movement thereof.

The forward end of the bore of bush 4 is enlarged to accommodate the enlarged front end of bush 8, the front end of whose bore is also enlarged to receive a third bush 26, which is rotatable within bush 8 and is retained therein by a radially disposed screw 27 screw-threaded into bush 8 and having its end engaging a circumferential groove 28 formed on the outer surface of said bush 26. The lens 9 is provided with a usual iris mechanism 29 which is controlled by an adjustment ring 30 mounted for limited rotation on the lens body 12, and a radially disposed pin 31 secured upon bush 26 engages a longitudinal slot in ring 30 to provide an operative connection between ring 30 and bush 26 whereby the adjustment of the iris of the lens may be effected by rotatory movement of bush 26 within bush 8.

While I have described and shown the preferred embodiment of my invention I do not wish to be limited to the precise details of construction as changes may readily be made without departing from the spirit of my invention, but having thus described my invention, I claim as new and desire to secure by Letters Patent the following:—

1. A device of the character described including an internally threaded bush, an externally threaded bush screwthreaded into said first mentioned bush, and a friction device including a friction element mounted on one of said bushes and frictionally engaging the other bush and adapted to be disengaged from said other bush to permit easy manipulation of said bushes into and out of screw-threaded engagement.

2. A device of the character described including an internally threaded bush, an externally threaded bush screwthreaded into said first mentioned bush and means for fixing said bushes while in screwthreaded engagement in various adjustments against accidental relative movement and including a resilient element fixed with one of said bushes and engaging the other bush and adapted to be disengaged from said other bush to permit manipulation of said bushes into and out of screwthreaded engagement.

3. A device of the character described including an internally threaded bush, an externally threaded bush screwthreaded into said first mentioned bush, a friction device normally frictionally connecting said bushes and including a resilient element mounted on one of said bushes, and a releasing element movably mounted on said one bush and adapted when moved to one position to move said resilient element to release said bushes of said frictional connection and adapted while in such position to maintain said resilient element in releasing position.

4. A device of the nature described including an internally threaded bush, an externally threaded bush screwthreaded into said first mentioned bush, a friction device normally frictionally connecting said bushes and including a flat spring element secured at one of its ends to said first mentioned bush, and a releasing lever pivotally mounted on said first mentioned bush and adapted when moved to one position to move the free end of said spring element to release said bushes of said frictional connection and adapted while in such position to maintain said spring element in releasing position.

5. A device of the nature described including an internally threaded bush, an externally threaded bush screwthreaded into said first mentioned bush, a friction device normally frictionally connecting said bushes and including a flat spring element secured adjacent one of its ends to the outer surface of said first mentioned bush, and a releasing lever pivotally mounted on the outer surface of said first mentioned bush and adapted when moved to one position to move between said first mentioned bush and the spring element and to move the free end of said spring element to release said bushes of said frictional connection and adapted when in such position to maintain said spring element in releasing position.

6. A device of the character described including a bush provided with an internally extending circular rib, a lens body within said bush and having a rearwardly facing shoulder, a ring screwthreaded upon the lens body against the shoulder thereof and adapted to be clamped against a side of said internally extending rib, and means adapted to clamp said ring against a side of said rib and including an element in screwthreaded engagement with said ring.

7. A device of the character described including a bush provided with an internally extending circular rib, a lens body within said bush and having a rearwardly facing shoulder, a ring screwthreaded upon the lens body against the shoulder thereof and adapted to be clamped against a side of said internally extending rib, and a clamp ring screwthreaded into said first mentioned ring and having an externally extending circular rib adapted to be clamped against the side of said first mentioned rib opposite that against which said first mentioned ring is adapted to be clamped.

8. A device of the character described including a bush provided with an internally extending circular rib, a lens body within said bush and having a rearwardly facing shoulder, a ring screwthreaded upon the lens body against the shoulder thereof and adapted to be clamped against a side of said internally extending rib, and a clamp ring in screwthreaded engagement with the rear end of said first mentioned ring and having an externally extending circular rib adapted to be clamped against the side of said first mentioned rib opposite that against which said first mentioned ring is adapted to be clamped.

9. A device of the character described including a bush provided with an internally extending circular rib, a lens body within said bush and having a rearwardly facing shoulder, a ring screwthreaded upon the lens body against the shoulder thereof and adapted to be clamped against a side of said internally extending rib means for rotatively fixing said lens body and ring within said bush including a radially disposed headed screw extending through an opening in said ring and screwthreaded into said lens body, and a clamp ring screwthreaded into said first mentioned ring and having an externally extending circular rib adapted to be clamped against the side of said first mentioned rib opposite that against which said first mentioned ring is adapted to be clamped.

In witness whereof I hereunto affix my signature this ninth day of October, 1919, A. D.

ALBERT S. HOWELL.